United States Patent [19]

Sibley et al.

[11] Patent Number: 4,603,591

[45] Date of Patent: Aug. 5, 1986

[54] DEVICE RESPONSIVE TO SHOCK FORCES

[75] Inventors: Richard D. Sibley, Anaheim; William F. Keller, West Covina, both of Calif.

[73] Assignee: Koso International, Inc., Santa Fe Springs, Calif.

[21] Appl. No.: 671,588

[22] Filed: Nov. 15, 1984

[51] Int. Cl.$^4$ .................. G05G 17/00; F16K 17/36
[52] U.S. Cl. ...................................... 74/2; 137/38
[58] Field of Search ........... 74/2; 200/61.45 R, 61.52; 137/38

[56] References Cited

U.S. PATENT DOCUMENTS

| 2,017,274 | 10/1935 | Breitenstein | 200/61.52 |
| 2,206,067 | 7/1940 | Waltamath | 200/61.45 R |
| 2,637,331 | 5/1953 | Sullivan | 137/39 |
| 2,927,982 | 3/1960 | Slough | 200/61.47 |
| 3,878,858 | 4/1975 | Yamada | 137/38 |
| 4,007,643 | 2/1977 | Matsushita | 74/2 |
| 4,178,492 | 12/1979 | Roesch et al. | 200/61.45 R |
| 4,185,507 | 1/1980 | Domyan | 74/2 |
| 4,207,912 | 6/1980 | Ichikawa | 137/39 |
| 4,261,379 | 4/1981 | Berry | 137/39 |

FOREIGN PATENT DOCUMENTS 2032065  4/1980  United Kingdom ..................... 74/2

Primary Examiner—Allan D. Herrmann
Attorney, Agent, or Firm—William P. Green

[57] ABSTRACT

A device adapted to be actuated by seismic forces or other shock forces, to operate a valve or other controlled unit automatically when the device senses such forces. The device includes a support structure on which a weight is supported in a predetermined position relative to which the weight is displaceable laterally by shock forces in a manner causing a coacting element to be moved by the weight and actuate the controlled unit. Releasable holding means actuated by the weight function to retain the specified coacting element against movement in a direction to actuate the controlled unit so long as the weight remains in its predetermined normal position, to thereby prevent undesired actuation of the element and controlled unit by transitory forces which do not displace the weight laterally.

19 Claims, 5 Drawing Figures

DEVICE RESPONSIVE TO SHOCK FORCES

BACKGROUND OF THE INVENTION

This invention relates to devices for automatically actuating a controlled unit, such as a valve, in response to seismic forces or other shock forces of predetermined magnitude.

Various types of devices have been proposed in the past in which a weight is displaceable by seismic or other shock forces relative to a support structure and functions by such relative displacement to actuate a mechanism for operating a controlled unit, as for instance to close a valve when an earthquake occurs. One such device is shown in U.S. Pat. No. 4,185,507 issued Jan. 29, 1980 to Domyan, in which the support structure is a pedestal having an upper surface upon which the actuating weight is located, with the coacting mechanism including a tube disposed about the pedestal and adapted to be actuated downwardly by the weight when it is displaced laterally from its normal position on the pedestal.

SUMMARY OF THE INVENTION

A purpose of the present invention is to provide an improved shock responsive device which may be of the above discussed general type and which is especially designed to prevent unwanted actuation of the mechanism by transitory forces which may be encountered but are not of the magnitude or character to which the device is intended to respond. Preferably, the device is constructed to respond selectively to only horizontal shock forces, and effectively eliminate any possibility of tripping of the mechanism as a result of inertia induced movement of an element or elements of the actuating mechanism when subjected to vertical forces.

To achieve this result, we employ holding means which act to retain a weight actuated element of the tripping mechanism against movement in a direction to actuate the controlled unit so long as the seismicly displaceable weight is located in its predetermined normal position on the support structure. The weight actuated element may be located at a side of the support structure, to be displaceable downwardly relative to that structure upon lateral or horizontal movement of the weight from its normal position, but may be latched against downward movement as long as the weight remains in its normal position. The element may be held against such downward movement by a part which is actuated downwardly by the weight in its normal position, but is free to move upwardly when the weight moves laterally from that position. The part may be a lever mounted for pivotal movement relative to the support structure, with a first end of the lever being displaceable downwardly by the weight in its normal position, and with a second end of the lever engaging the movable element to hold it against downward movement. The protection afforded by the apparatus may be enhanced by providing above the weight a confining structure which is engageable with the top of the weight in a manner restraining it against vertical movement while in the active position of the weight, to prevent tripping of the device by bodily upward movement of the weight relative to the support structure.

BRIEF DESCRIPTION OF THE DRAWINGS

The above and other features and objects of the invention will be better understood from the following detailed description of the typically embodiment illustrated in the accompanying drawings in which.

DESCRIPTION OF THE PREFERRED EMBODIMENT

Figure 1:
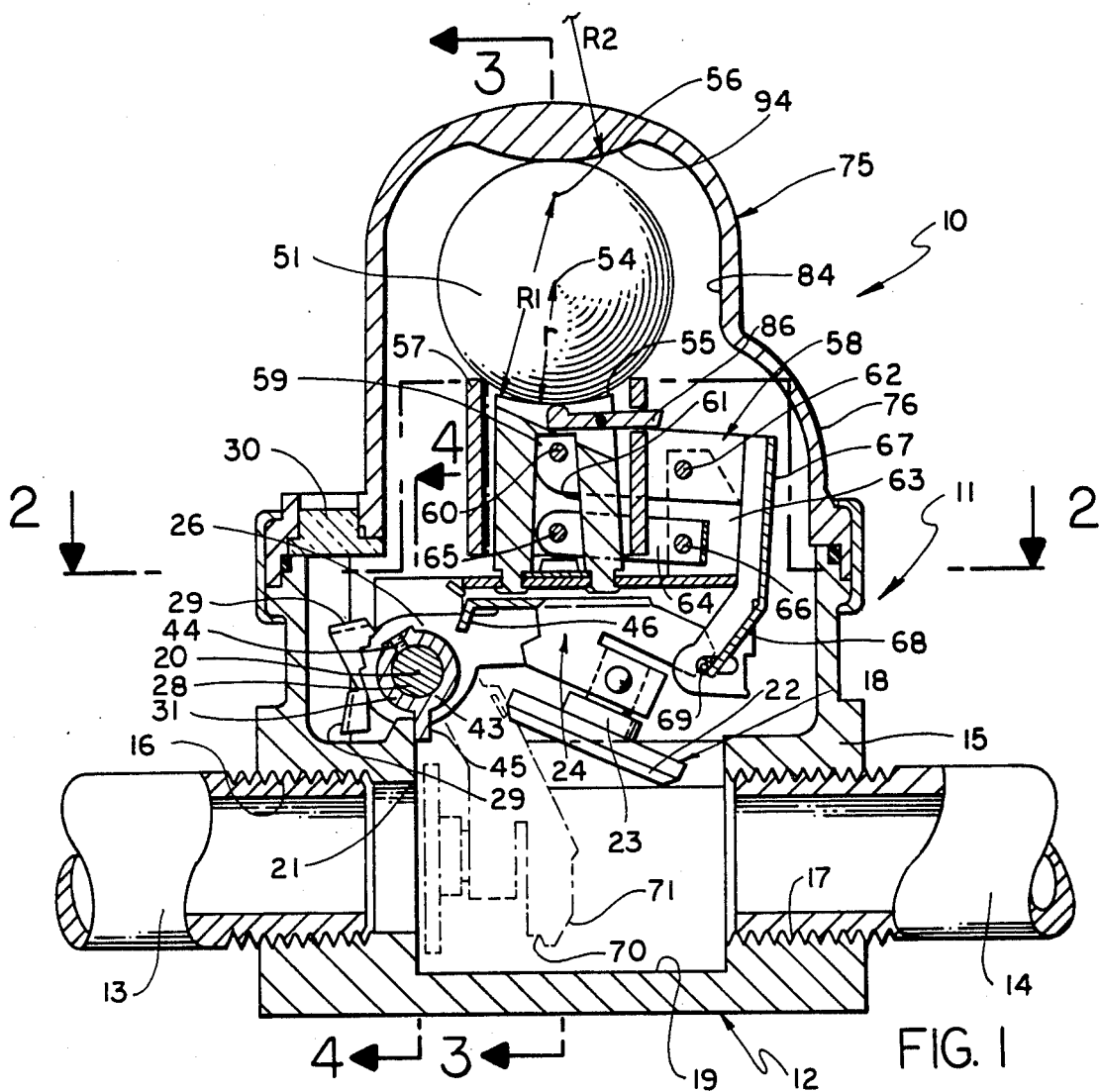
FIG. 1 is an axial sectional view through a valve actuator constructed in accordance with the invention.

The device 10 shown in the drawings includes an actuator 11 which acts upon subjection to seismic or other shock forces to actuate a controlled unit 12 between two different conditions. Unit 12 is preferably a valve which functions in the broken line position of FIG. 1 to close off the delivery of natural gas or another fluid from an inlet line 13 to an outlet line 14.

Valve 12 may include a hollow body 15 having aligned inlet and outlet openings 16 and 17 into which lines 13 and 14 are threadedly connectible. A circular valve element 18 is mounted within the inner chamber 19 in valve body 15 for swinging movement about an axis 20 between an open position illustrated in full lines in FIG. 1 and a closed broken line position of annular engagement with a circular seat 21 formed in the valve body. Element 18 may include a circular sealing part 22 of rubber or other elastomeric material carried by a rigid metal part 23 attached to an arm 24 which mounts the valve element for its swinging movement. Arm 24 may be stamped of sheet metal and have two spaced vertical wall portions 25 and 26 containing aligned openings 27 through which a mounting shaft 28 carried by body 15 extends to mount arm 24 and valve element 18 for the discussed pivotal movement. Two indicator tabs 29 are carried by and project from portion 25 of arm 24 and have "open" and "closed" markings formed thereon and visible from the outside of the housing through a sealed transparent window 30, to indicate the open or closed condition of the valve. The shaft may be mounted to be turned about axis 20 by a short extension shaft 31 aligned with shaft 28 and engaging it at 32 in a relation transmitting rotation between the parts to reset the mechanism. Shaft 28 may be journaled for rotation by reception within aligned bearing openings 33 in two spaced vertical members 34 which may be formed as downwardly turned portions of a horizontal plate 35 attached rigidly to the valve body 15 as by upset rivet lugs 36 formed by that body. The shaft extension 31 may be mounted rotatably within a passage 37 formed in the side wall of body 15, and be sealed with respect thereto by a rubber O-ring 38. Element 31 may be retained against axial withdrawal from body 15 by a hairpin type spring clip 39 slidably insertable into a passage 40 in body 15 to a position of reception within an annular groove 41 in shaft 31. A screwdriver slot 42 in the outer end of shaft 31 enables that shaft and the connected main shaft 28 to be turned about axis 20 to reset the valve. A tubular part 43 carried about shaft 28 at its center (FIG. 1) is fixed to the shaft by a set screw 44 and has a lug 45 engageable with a shoulder 46 formed as a portion of arm 24 in a relation forming a lost motion connection between shaft 28 and arm 24 by which the shaft can swing the arm and carried valve in a counterclockwise direction as viewed in FIG. 1.

Figure 4:
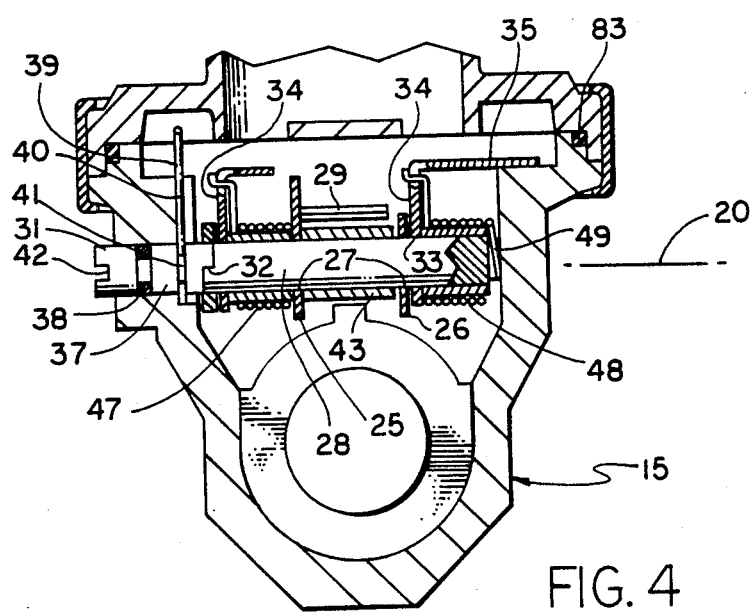

Arm 24 is yieldingly urged pivotally about axis 20 in a clockwise direction as viewed in FIG. 1 and to the broken line closed-valve position of that figure by a coil spring 47 (FIG. 4) disposed about the shaft and having its opposite ends engaged with the arm and with one of the portions 34 of plate 35. A second coil spring 48 about the shaft has its ends engaged with a shoulder on shaft 28 at 49 and with the second portion 34 of plate 35 to urge the shafts 28 and 31 and part 43 in a clockwise direction as viewed in FIG. 1 and to the FIG. 1 full line position of part 43.

Actuator 11 includes a shock responsive inertia actuated assembly 50 including a weight or mass 51 which may take the form of a solid ball or sphere of metal. When valve element 18 is open, ball 51 is supported on a pedestal 52 extending upwardly along a vertical axis 53, with the center 54 of the ball located on that axis. The pedestal may be externally circular about axis 53, and taper slightly as shown, and have an upper spherically curved surface 55 defining an upwardly facing shallow recess of a depth and contour to normally retain ball 51 in its centered position. Spherical surface 55 of the pedestal has its center 56 located on axis 53 and has a radius of curvature R which is desirably greater than the radius of curvature r of the outer spherical surface of ball 51. The ball is displaceable from its normal centered position on the pedestal, as to the full line position of FIG. 3 or the position of FIG. 5, by shock induced movement of the pedestal relative to the ball, during which movement the inertia of the ball resists movement thereof with the pedestal. The lower end of the pedestal 52 may be attached rigidly to the previously mentioned horizontal base plate 35 secured to valve body 15.

Figure 2:
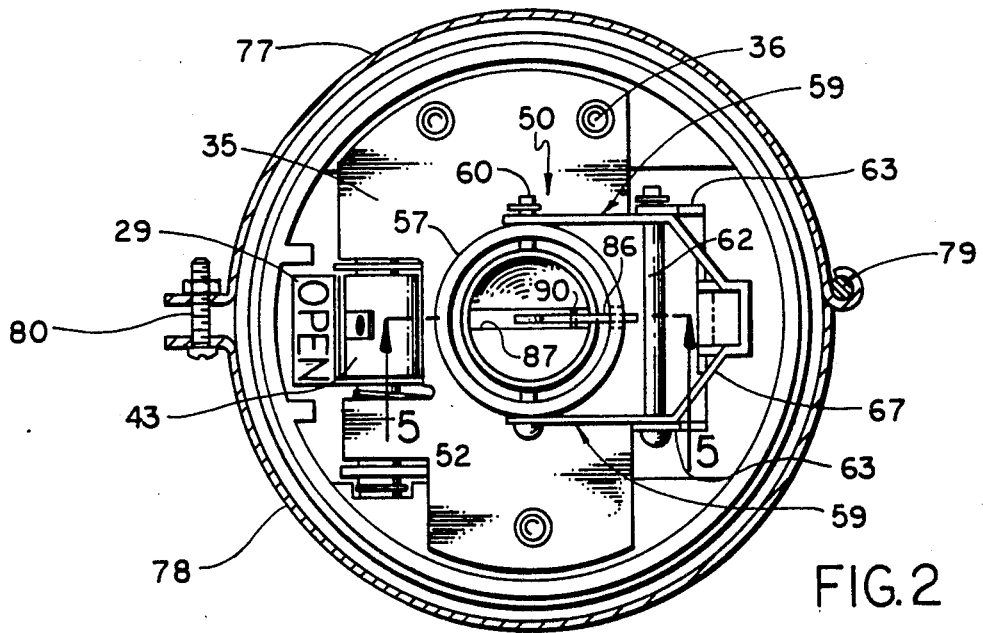
FIG. 2 is a horizontal section taken on line 2—2 of FIG. 1.
Figure 3:
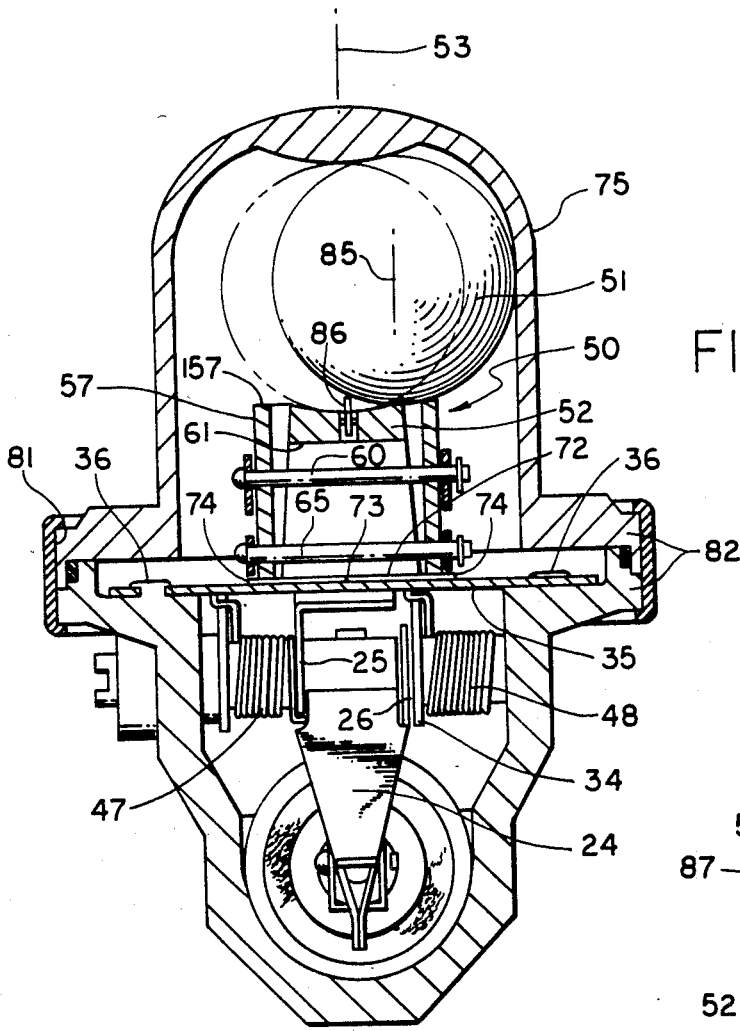
FIGS. 3 and 4 are vertical sections taken on lines 3—3 and 4—4 of FIG. 1 but showing the valve in its closed position.

A vertical tube 57 which is centered about axis 53 and disposed about and spaced from pedestal 52 is movable vertically relative to the pedestal between the FIG. 1 and FIG. 3 positions. The tube may be mounted for this movement by a parallelogram mechanism 58, including two similar parallel upper links 59 each pivoted at one end to the tube by a horizontal pin 60 extending through a vertical slot 61 in pedestal 52, and each pivoted by a second parallel horizontal pin 62 to a pair of vertical bracket arms 63 projecting upwardly from plate 35. Mechanism 58 also includes two similar parallel lower links 64 each pivoted by a first pin 65 to the tube and by a second pin 66 to the bracket arms 63. The two upper links 59 may be stamped from a single piece of sheet metal, forming a cross piece 67 at the right ends of the links as seen in FIG. 1, and forming two spaced parallel vertical side walls 68 projecting downwardly and carrying a cross pin 69 which acts to engage valve element 18 and latch it in open position. For engagement with pin 69, the valve mounting arm 24 contains a notch 70 within which pin 69 is received in the open FIG. 1 full line position of the valve to retain the valve against closing movement. Upon upward swinging movement of arm 24, a cam surface 71 on the arm engages and deflects pin 69 in a manner allowing the arm to pass the pin and permit movement of the pin into its latched position within notch 70. Downward movement of tube 57 causes rightward swinging movement of cross pin 69 to release the valve for closing movement. The tube is yieldingly urged upwardly by an appropriate spring, typically a leaf spring 72 (FIG. 3) welded at a central location 73 to plate 35 and having end portions 74 urged upwardly and applying yielding upward force to tube 57 at diametrically opposite locations. When weight 51 is moved laterally in any horizontal direction relative to pedestal 52, as to the full line position of FIG. 3 or the position of FIG. 5, the weight engages tube 57 and displaces it downwardly to the position of FIGS. 3 and 5 to move pin 69 out of notch 70 in arm 24 and allow closure of the valve element by spring 47. Such lateral displacement of the weight is limited by engagement of the weight with a dome shaped housing 75 which is attached to and projects upwardly from valve body 15, and which is symmetrical with respect to axis 53 except at the location of an enlargement or bulge 76 at its right side as viewed in FIG. 1. This housing 75 is detachably secured to the valve body by an annular clamp assembly typically formed of two semicircular sections 77 and 78 (FIG. 2), having first ends connected pivotally together at 79 and having second ends connected together by a screw 80. This clamp contains an annular groove or recess 81 receiving annular flanges 82 of parts 15 and 75 to secure them tightly together and in annular sealing engagement with a rubber O-ring or other gasket 83. Except at the location of the enlargement or bulge 76, the side wall 84 of housing 75 may extend directly vertically, so that the portion of the side wall which is contacted by the ball in any of its various possible horizontally actuated positions is directly vertical. When the ball is in any such laterally displaced position of engagement with side wall 84 of housing 75, the ball is in contact with the upper annular typically horizontal edge 157 of tube 57 in a relation actuating it downwardly by the weight of the ball and relative to pedestal 52 and the housing and valve body. In this condition (for example the full line position of FIG. 3), the point of contact of tube 57 with the underside of the ball is beyond the vertical central axis of the ball in a direction outwardly away from axis 53 (that is, to the right of axis 85 extending vertically through the center 54 of the ball in FIG. 3), so that upon cessation of the shock forces or other forces which displace the ball, the upward force applied to the ball by tube 57 will be at a location causing the ball to be cammed inwardly to its original centered position on the pedestal. The ball thus automatically resets itself to the FIG. 1 centered position when permitted to do so.

The present invention is particularly concerned with the provision in the actuator shown in the drawings of a unique holding part 86 which acts to retain the vertically movable tube 57 against downward movement under the influence of vertical shock forces so long as ball 51 remains in its normal centered position of FIG. 1 on pedestal 52. Thus, if a person either intentionally or unintentionally strikes the housing of the device vertically, such a blow cannot induce downward movement of tube 57 in a manner releasing valve 18 for closing movement. To attain this result, holding part 86 is formed as a lever contained partially within a vertical slot 87 formed in the upper end of pedestal 52 and extending diametrically thereacross, with this lever having a first end 88 projecting laterally outwardly beyond the exterior of pedestal 52 and into an opening 89 formed in the side wall of tube 57. Lever 86 is connected pivotally to pedestal 52 by a horizontal pin 90, for swinging movement about the axis of that pin between the positions of FIGS. 1 and 5. The second end 91 of lever 86 projects upwardly at the location of vertical axis 53 of the device. In the FIG. 1 condition of the apparatus in which ball 51 is located on the pedestal and the tube 57 about the pedestal is in its upper position, the upper extremity of end 91 of the lever 86 is essentially flush with the central portion of the upper concave spherically curved surface 55 of the pedestal, and is held in this depressed flush condition by the ball. In that condition, the upper edge 92 of the outer end 88 of lever 86 (FIG. 5) is in engagement with a downwardly facing shoulder 93 formed by the material of tube 57 at the top of its opening 89 to retain the tube against downward movement so long as the ball remains in its FIG. 1 position. The weight thus positively prevents downward movement of tube 57 and release of the valve for closing movement under the influence of any vertical shock forces which may be applied to the housing of the device.

Ball 51 is preferably retained against upward movement from its FIG. 1 position of support on the center of the pedestal by forming the top of housing 75 to have a downwardly facing surface 94 directly above and in vertical alignment with the top surface 55 of the pedestal for engaging the top central portion of the ball in a manner confining the ball closely between surfaces 55 and 94 and preventing any substantial vertical movement of the ball between those surfaces. Preferably, surface 94 is curved spherically about a center located on vertical axis 53 and has a radius of curvature $R_2$ equal to the radius of curvature R of surface 55, so that the vertical spacing between surfaces 55 and 94 is the same at all points on the surfaces. Thus, the ball is confined against vertical movement when in the FIG. 1 position and also remains effectively confined between these surfaces as the ball moves laterally outwardly in any direction and so long as the ball is in a position to still engage both of those surfaces.

In placing the device 10 in use, the valve body is attached to inlet and outlet lines 13 and 14 in a position in which axis 53 of the device extends directly vertically, so that ball 51 can normally be received within the shallow recess 55 of pedestal 52 and will be retained by gravity in its centered position in that recess. With the ball thus located in its FIG. 1 full line position, valve element 18 is set to its open position by swinging the valve element in a counterclockwise direction as viewed in FIG. 1 and to the full line position of that figure. This setting of the valve element may be effected by inserting a screwdriver into slot 42 of shaft 31 (FIG. 4) and turning that shaft and the connected shaft 28 and part 24, against the tendency of spring 49, from the FIG. 1 full line position of lug 45 on part 43 to its broken line position of that figure. During the initial portion of this counterclockwise movement of part 43, lug 45 of that part swings toward shoulder 46 of valve carrying arm 24 without movement of that arm. After lug 45 contacts shoulder 46, continued movement of the shafts and part 43 acts to swing arm 24 and the valve toward the full line open valve position of FIG. 1. In approaching that position, cam surface 71 on valve arm 24 engages pin 69, and deflects that pin slightly to enable it to ultimately move into notch 70 and be retained in that notch by spring 72 in a manner holding the valve open.

Figure 5:
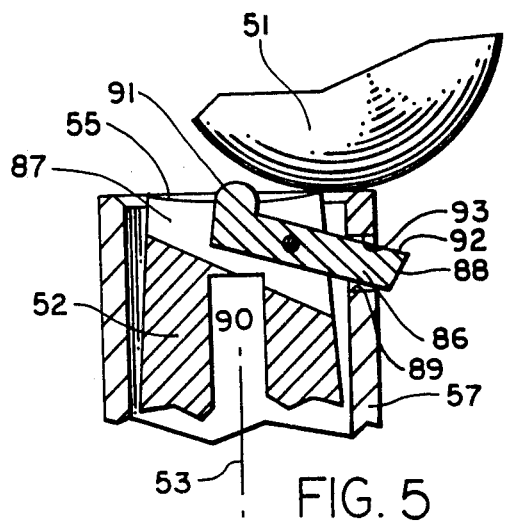
FIG. 5 is an enlarged fragmentary vertical section taken in the plane of FIG. 1, and showing the weight displaced laterally to its valve closing position.

In the event of a earthquake, explosion, or other occurence applying horizontal shock forces to the device, these forces will function to rapidly displace the valve body, housing 75, pedestal 52, tube 57, and all of the other associated parts horizontally, while ball 51 tends to resist such movement by virtue of its very substantial inertia, with the result that the ball moves relative to the housing parts and other elements to a laterally offset position such as the full line position of FIG. 3 or the position of FIG. 5. The ball in moving laterally away from axis 53 contacts and displaces downwardly the tube 57, causing arm 67-68 and pin 69 to swing to a position releasing the valve for closing movement under the influence of spring 47 to the position illustrated in broken lines in FIG. 1 and in full lines in FIG. 3. Upon cessation of the actuating shock force, the ball automatically returns to its centered position as previously discussed leaving the valve closed but permitting it to be reset to open condition.

If a person attempts to trip the valve by striking the housing with a hammer or other tool or element, such a blow if horizontal cannot usually develop enough lateral movement of the ball 51 to release the valve, and if vertical is prevented by part 86 from causing downward movement of tube 57 and in that way releasing the valve. As discussed, so long as ball 51 is in or near its normal centered position of FIG. 1 on top of pedestal 52, the ball will hold end 91 of lever 86 in a depressed condition in which the outer end 88 of the lever retains tube 57 against downward movement from its FIG. 1 position and thus prevents closure of valve 18. Unless and until ball 51 is moved laterally by earthquake or other shock forces to a position such as that illustrated in FIG. 3 or FIG. 5, lever 86 positively prevents downward movement of tube 57 and thus assures maintenance of the valve in its open position.

While a certain specific embodiment of the present invention has been disclosed as typical, the invention is of course not limited to this particular form, but rather is applicable broadly to all such variations as fall within the scope of the appended claims.

We claim:

1. A shock responsive device comprising:
    a support structure;
    a weight adapted to be supported in a predetermined position by said structure and which is displaceable laterally from said position by shock forces;
    mechanism for actuating a controlled unit in response to said shock induced lateral displacement of the weight, including an element adapted, upon said lateral displacement of the weight, to be engaged by the weight and moved by the weight in a diredtion to actuate said unit; and
    releasable holding means operable by said weight to retain said element against movement in said direction while the weight remains in said predetermined position but adapted to be automatically released by the weight to permit said movement of said element for actuation of the controlled unit upon said lateral displacement of the weight from said predetermined position thereof.

2. A shock responsive device as recited in claim 1, in which said releasable holding means include a part mounted for pivotal movement relative to said support structure between an active position in which it retains said element against movement in said direction and a released position permitting such movement, and having a portion acted against by said weight in said predetermined position thereof in a relation holding said part against movement to said released position.

3. A shock responsive device as recited in claim 1, in which said holding means include a part which is movable upwardly and downwardly relative to said support structure and is held by the weight in a lower position in which said part retains said element against movement in said direction when the weight is in said predetermined position thereof.

4. A shock responsive device as recited in claim 1, in which said support structure has an upper surface on which said weight is supported in said predetermined position thereof, there being a confining member having a downwardly facing surface spaced above said upper surface of the support structure and engageable with an upper surface of said weight to confine the weight against upward movement in said predetermined position far enough to release said holding means.

5. A shock responsive device as recited in claim 1, in which said releasable holding means include a lever mounted for pivotal movement relative to said support structure and having a first end displaceable downwardly by said weight when in said predetermined position, and a second end projecting laterally to a position coacting with said element in a relation retaining said element against downward movement when said first end of the lever is displaced downwardly by the weight.

6. A combination including a shock responsive device as recited in claim 1, and said controlled unit as an element of the claim actuable by said mechanism of said shock responsive device upon lateral displacement of said weight from said predetermined position thereof.

7. A shock responsive device comprising:
a support pedestal having an upper surface;
a weight adapted to be supported in a predetermined position on said upper surface of said pedestal and which is displaceable laterally from said position by shock forces;
an essentially tubular element disposed about said pedestal and adapted to be moved downwardly by the weight upon lateral displacement of the weight in any of different directions from said predetermined position;
mechanism operable by said element upon downward displacement thereof by the weight to actuate a controlled unit; and
a holding lever mounted for pivotal movement relative to said pedestal and having a first end displaceable to a lower position by said weight when the weight is in said predetermined position, and a second end projecting laterally and coacting with said tubular element in a relation holding said tubular element against downward movement far enough to actuate said controlled unit when said first end of said lever is held in said lower position thereof by the weight.

8. A shock responsive device as recited in claim 7, in which said second end of said lever projects into an opening in said tubular element.

9. A shock responsive device as recited in claim 7, in which said pedestal contains a recess within which said lever is received and pivotally movable.

10. A shock responsive device as recited in claim 7, in which said upper surface of the pedestal is slightly concave, said pedestal containing a slit extending essentially diametrically thereacross and within which said lever is mounted pivotally.

11. A shock responsive device as recited in claim 7, including a member spaced above said upper surface of the pedestal at a location confining said weight against upward movement far enough to enable said lever to pivot to an extent permitting actuation of said controlled unit by said element.

12. A shock responsive device as recited in claim 7, in which said weight is essentially spherical, said upper surface of the pedestal being curved concavely and essentially spherically, there being a member spaced above said upper surface of the pedestal and having a downwardly facing surface with an essentially spherical convex curvature corresponding substantially to the curvature of said upper surface of the pedestal and positioned to confine the weight against upward movement in said predetermined position thereof far enough to enable said lever by pivotal movement to permit actuation of said controlled unit by downward movement of said essentially tubular element.

13. A shock responsive device as recited in claim 12, in which said mechanism includes a swinging arm spring urged in a predetermined direction, a latch element for releasably retaining said swinging arm against movement in said direction, and a second lever pivotally movable by downward movement of said essentially tubular element and acting upon such pivotal movement to release said latch element.

14. A combination including a shock responsive device as recited in claim 13, and said controlled unit as an element of the claim actuable by said mechanism of said shock responsive device upon lateral displacement of said weight from said predetermined position thereof.

15. A combination including a shock responsive device as recited in claim 7, and said controlled unit as an element of the claim actuable by said mechanism of said shock responsive device upon lateral displacement of said weight from said predetermined position thereof.

16. A shock responsive device comprising:
a support structure;
a weight adapted to be supported in a predetermined position by said structure and which is displaceable laterally from said position by shock forces;
mechanism for actuating a controlled unit in response to said shock induced lateral displacement of the weight, including an element adapted to be engaged and displaced downwardly by the weight upon said lateral displacement of the weight from said predetermined position thereof; and
releasable holding means operable by said weight to retain said element against downward movement while the weight remains in said predetermined position but adapted to be automatically released by the weight to permit said downward movement of said element for actuation of the controlled unit upon said lateral displacement of the weight from said predetermined position thereof.

17. A shock responsive device comprising:
a support structure;
a weight adapted to be supported in a predetermined position by said structure and which is displaceable laterally from said position by shock forces;
mechanism for actuating a controlled unit in response to said shock induced lateral displacement of the weight, including an element adapted to be moved by the weight in a direction to actuate said unit upon said lateral displacement of the weight; and
releasable holding means operable by said weight to retain said element against movement in said direction while the weight remains in said predetermined position but adapted to be automatically released by the weight to permit said movement of said element for actuation of the controlled unit upon said lateral displacement of the weight from said predetermined position thereof;

said support structure being a pedestal having an upper surface on which said weight is supported, said element being disposed essentially about said pedestal and adapted to be actuated downwardly by the weight upon said lateral displacement thereof from said predetermined position.

18. A shock responsive device comprising:

a support structure;

a weight adapted to be supported in a predetermined position by said structure and which is displaceable laterally from said position by shock forces;

mechanism for actuating a controlled unit in response to said shock induced lateral displacement of the weight, including an element adapted to be moved by the weight in a direction to actuate said unit upon said lateral displacement of the weight;

releaseable holding means operable by said weight to retain said element against movement in said direction while the weight remains in said predetermined position but adapted to be automatically released by the weight to permit said movement of said element for actuation of the controlled unit upon said lateral displacement of the weight from said predetermined position thereof;

said structure having an upper surface on which said weight is supported in said predetermined position thereof;

a confining member having a downwardly facing surface spaced above said upper surface of the support structure and engageable with an upper surface of said weight to confine the weight against upward movement in said predetermined position far enough to release said holding means;

said upper surface of said support structure being slightly concave to retain the weight in said predetermined position, and said downwardly facing surface of said member being slightly convex.

19. A shock responsive device comprising:

a support structure;

a weight adapted to be supported in a predetermined position by said structure and which is displaceable laterally from said position by shock forces;

mechanism for actuating a controlled unit in response to said shock induced lateral displacement of the weight, including an element adapted to be moved by the weight in a direction to actuate said unit upon said lateral displacement of the weight;

releasable holding means operable by said weight to retain said element against movement in said direction while the weight remains in said predetermined position but adapted to be automatically released by the weight to permit said movement of said element for actuation of the controlled unit upon said lateral displacement of the weight from said predetermined position thereof;

said support structure having an upper surface on which said weight is supported in said predetermined position thereof;

a confining member having a downwardly facing surface spaced above said upper surface of the support structure and engageable with an upper surface of said weight to confine the weight against upward movement in said predetermined position far enough to release said holding means;

said upper surface of said support structure being slightly concave, and said downwardly facing surface of said member being slightly convex with a radius of curvature corresponding essentially to that of said upper surface of the support structure.

* * * * *